United States Patent
Jensen

(10) Patent No.: US 8,213,865 B2
(45) Date of Patent: Jul. 3, 2012

(54) METHODS AND APPARATUS TO REDUCE POWER CONSUMPTION IN A WIRELESS DEVICE

(75) Inventor: Mathias Stein Gunnar Jensen, Skui (NO)

(73) Assignee: Texas Instruments Incorporated, Dallas, TX (US)

( * ) Notice: Subject to any disclaimer, the term of this patent is extended or adjusted under 35 U.S.C. 154(b) by 1169 days.

(21) Appl. No.: 12/035,159

(22) Filed: Feb. 21, 2008

(65) Prior Publication Data

US 2008/0220828 A1    Sep. 11, 2008

(30) Foreign Application Priority Data

Mar. 9, 2007 (GB) .................................. 0704600.6

(51) Int. Cl.
*H04B 7/00* (2006.01)
(52) U.S. Cl. ........ 455/41.3; 455/41.1; 455/574; 455/39; 345/166; 345/156; 345/163; 345/157; 713/320
(58) Field of Classification Search ................ 455/574, 455/41.2, 41.3; 345/166, 156, 163, 157; 713/320
See application file for complete search history.

(56) References Cited

U.S. PATENT DOCUMENTS

| | | | |
|---|---|---|---|
| 6,067,589 A | 5/2000 | Mamata | |
| 7,161,585 B2 | 1/2007 | Lauffenburger et al. | |
| 7,292,225 B2 * | 11/2007 | Gordon et al. | 345/163 |
| 7,295,183 B2 * | 11/2007 | Willemin et al. | 345/156 |
| 7,466,305 B2 * | 12/2008 | Lin et al. | 345/163 |
| 7,586,482 B2 * | 9/2009 | Lin et al. | 345/163 |
| 2003/0179183 A1 * | 9/2003 | Lee | 345/163 |
| 2005/0078087 A1 * | 4/2005 | Gates et al. | 345/163 |
| 2005/0206613 A1 * | 9/2005 | Chan et al. | 345/156 |
| 2005/0231472 A1 * | 10/2005 | Gordon et al. | 345/157 |
| 2007/0024587 A1 * | 2/2007 | Shiau | 345/166 |
| 2007/0043293 A1 | 2/2007 | Jones et al. | |
| 2007/0132733 A1 * | 6/2007 | Ram | 345/163 |

* cited by examiner

*Primary Examiner* — April G Gonzales
(74) *Attorney, Agent, or Firm* — John J. Patti; Wade J. Brady, III; Frederick J. Telecky, Jr.

(57) ABSTRACT

Methods and apparatus to reduce power consumption in a wireless device are disclosed. An example method includes sensing movement of the wireless device via a sensor unit; conveying data of a first size at a first frequency from the sensor unit to a first microcontroller, wherein the first microcontroller comprises data buffers of a second size; wirelessly transmitting data of the second size to a second microcontroller at a second frequency, wherein the second microcontroller comprises data buffers of the second size; and conveying data of the first size at a third frequency from the second microcontroller to an electronic device to communicate with the wireless device.

21 Claims, 3 Drawing Sheets

METHODS AND APPARATUS TO REDUCE POWER CONSUMPTION IN A WIRELESS DEVICE

RELATED APPLICATION

This application claims priority from United Kingdom provisional patent application number GB0704600.6, filed on Mar. 9, 2007, entitled "Improvements in or Relating to Wireless Peripheral Communications," which is hereby incorporated by reference in its entirety.

FIELD OF DISCLOSURE

The present disclosure relates generally to wireless devices and, more particularly, to methods and apparatus to reduce power consumption in a wireless device.

BACKGROUND

To interact with an electronic system, users typically employ one or more peripheral devices. For example, a keyboard, mouse, printer, webcam, scanner, sound system, or any other input/output (I/O) device may expand the capabilities, options, and features of the electronic system. As processing technology improves, so too does the performance of these peripheral devices. Furthermore, advances in transmission hardware and software have enabled many peripheral devices to more effectively communicate wirelessly. While wireless communication eliminates the need for cables and wires, it also presents challenges regarding power consumption of the wireless devices. That is, while a wired peripheral device draws power from a power source (e.g., an outlet) or an electronic device to which it is attached (e.g., from a universal serial bus (USB) port of a computer), a wireless peripheral device is typically powered via batteries, which are expensive and have relatively short life spans.

One particular example of a wireless peripheral is a wireless mouse used with a personal computer. With the graphical user interfaces commonly provided on most personal computers, communicating with a personal computer without a functional mouse is difficult for most users. Additionally, it may be the case that there is little warning, if any, when, for example, a battery of a wireless mouse is close to expiration.

DETAILED DESCRIPTION

Methods and apparatus to reduce power consumption in a wireless device, such as a wireless mouse, are disclosed. Generally, the example methods and apparatus described herein utilize an asymmetric reporting frequency scheme to minimize how often one or more high power-consuming components of a wireless device are activated to convey data (e.g., data related to a movement of a wireless mouse) to an electronic device with which the wireless device communicates (e.g., a personal computer). Specifically, in an example implementation, the frequency at which data is wirelessly transmitted by, for example, a radio transceiver is relatively lower than the frequency at which data is transmitted between internal components of the wireless device. That is, the periodicity with which the wireless transmission takes place is lower than that of other components of the wireless device. Thus, the duty cycle of the wireless transceiver is lower than the duty cycle of, for example, mouse sensors or other communication devices of the wireless device.

To offset any issues (e.g., lessened responsiveness) that may be caused by the asymmetric frequency scheme, the size (e.g., an amount of bits) of data packets exchanged between components, as well as corresponding data buffers, are increased at certain points along the data transmission chain. In an example implementation, a larger number of bits are transmitted over the wireless communication channel per transmission than are transmitted between some internal components of the wireless device. Thus, given the larger number of bits per wireless transmission, a greater magnitude of, for example, movement data is conveyed. As described in greater detail below, utilizing such techniques reduces power consumption while maintaining the improved technological characteristics (e.g., faster sensor speeds or resolutions) of new devices.

Figure 1:
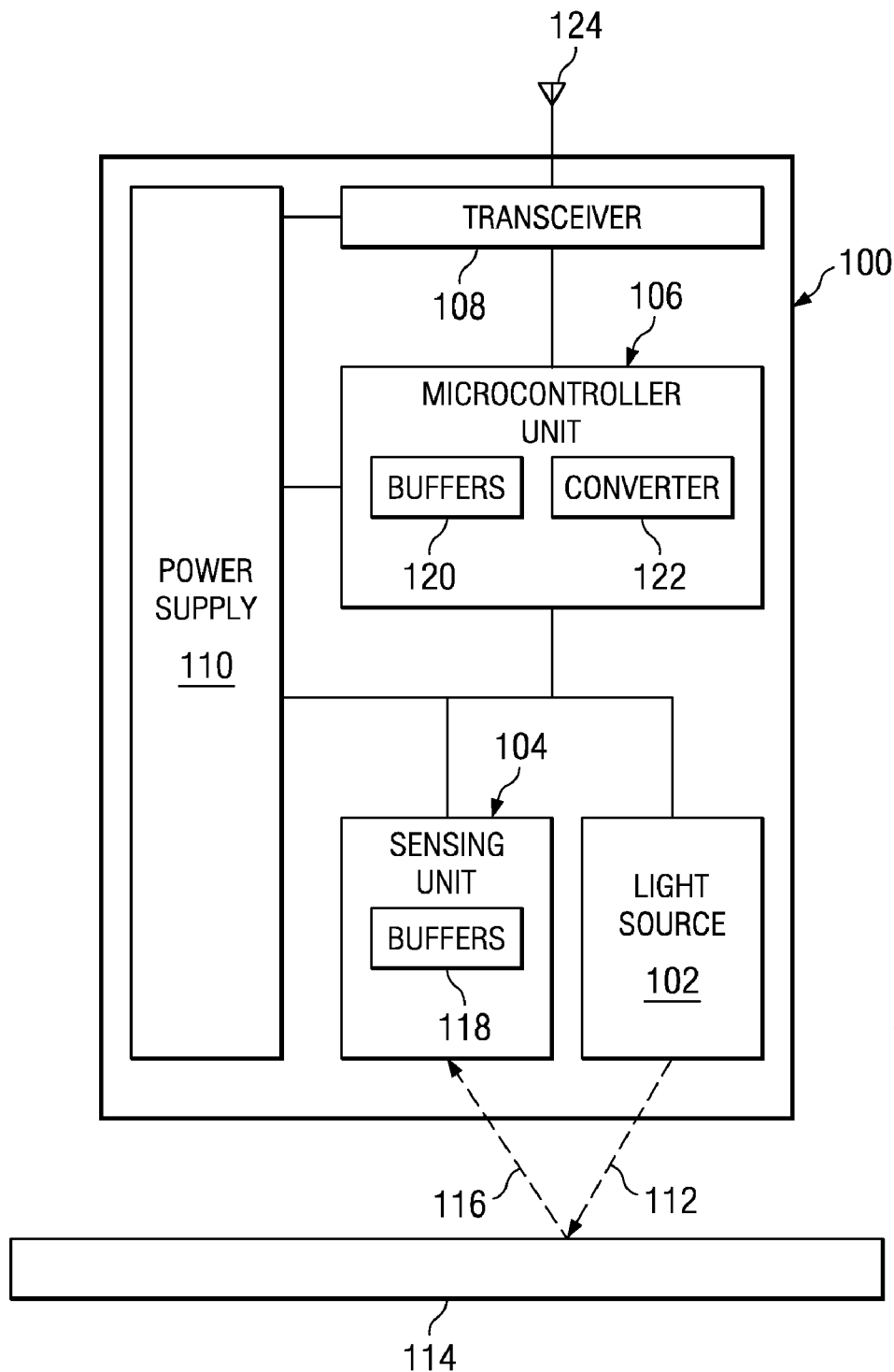
FIG. 1 is a block diagram of an example wireless device.

FIG. 1 is a block diagram of an example wireless peripheral device used to interact or, more generally, communicate with an electronic system, such as a personal computer. In the illustrated example of FIG. 1, the wireless device is a mouse 100. The mouse 100 includes a light source 102, a sensing unit 104, a microcontroller unit 106, a transceiver 108, and a power supply 110. The example mouse 100 may include additional components, such as button(s), interface(s), lens(es), converter(s), etc. not shown in the example of FIG. 1 for purposes of clarity.

The light source 102 is configured to emit light 112 onto a reflective surface, such as the outside of a tracking ball contained within the mouse 100 or, as illustrated in the example of FIG. 1, the surface of a desk 114 on which the mouse 100 rests and may be moved upon (e.g., by the hand of a user). The light source 102 may be a light emitting diode (LED), a laser, an infrared light source, or any other source of visible or non-visible light. The light may be conveyed through one or more lenses or filters (not shown) to control the intensity, emission, reflection, and/or detection of the light. Similar to other components of the mouse 100, the light source 102 is coupled to the power supply 110 to provide power. In some implementations, to conserve power, the light source 102 may be deactivated after a predetermined period (e.g., two minutes) of inactivity and/or when the electronic device with which the mouse 100 communicates is off, sleeping, or inactive in any other way.

Generally, the sensing unit 104 is configured to detect a reflection 116 of the light 112 emitted by the light source 102. In the illustrated example of FIG. 1, the sensing unit 104 comprises an array of photodetectors (e.g., photodiodes) arranged to detect movements of the mouse 100 by measuring an intensity of the reflected light 116 as received at each photodetector. As the mouse 100 moves to a new position, individual photodetectors of the array receive the light differently (e.g., brighter or dimmer) than as received at the previous position of the mouse 100 due to different reflections off of, for example, the desk 114. Readings are taken from the photodetector array and the results are interpreted to indicate movements in the horizontal direction (the X direction) and/or the vertical direction (the Y direction). For example, a first reading from the sensing unit 104 may be compared to a second reading to determine the position of the mouse 100 at the time of the second reading relative to the position of the mouse 100 at the time of the first reading. Differences between the two readings may be interpreted to determine a magnitude, velocity, and/or acceleration of any movements experienced by the mouse 100.

The characteristics of the sensing unit 104 dictate or at least influence the capabilities of the mouse 100. For example, in the illustrated example of FIG. 1, where the sensing unit 104 comprises a plurality of photodetectors, the resolution of the mouse 100 is dictated, at least in part, by the amount and density of photodetectors in the photodetector array. Mouse resolution may be expressed as counts per inch (CPI), which represents how many different readings or counts may be distinguished per inch of mouse movement. A higher CPI correlates to a higher sensitivity to movement because each count in a high CPI mouse represents a finer distance.

Further, the motion detection speed of the photodetectors, which is expressed here as inches per second (IPS), represents how many inches per second can be counted during mouse movement. Thus, the IPS of the mouse 100 can be multiplied by the CPI of the mouse 100 to determine how many counts per second can be recorded by the mouse 100. For example, a mouse supporting 800 CPI at 20 IPS is capable of recording 16,000 counts per second. However, for this high number of counts per second to be actualized, all of the counts must be relayed to a computer so that it may process those counts and convert the counts into movements on a display screen. As described below, frequencies of data transmission between different components are set to ensure that the full potential of the mouse 100 is supported. Illustratively, in the above example, frequencies of transmission are chosen such that the 16,000 counts are recorded and/or reported each second.

The example sensing unit 104 further includes one or more buffers 118, which are, in the illustrated example, larger than 8-bits. The buffers 118 store movement data before the movement data is transmitted for further processing. In particular, movement data from the buffers 118 of the sensing unit 104 is conveyed (e.g., serially transmitted) to the microcontroller unit 106 to, for example, be processed (e.g., interpreted, converted, translated, conditioned, wirelessly transmitted, etc.). In the illustrated example of FIG. 1, the sensing unit 104 conveys 8-bit data packets of movement data from the buffers 118 to the microcontroller unit 106. Specifically, the example sensing unit 104 conveys 8 bits of X movement and 8 bits of Y movement. Because the mouse 100, along with the corresponding pointer on a display device (e.g., a monitor coupled to a personal computer), may move in two directions for each axis of movement, one of the 8 bits (e.g., the leftmost, or most significant, bit) of movement data conveyed to the microcontroller unit 106 is dedicated to a directional indicator. Thus, the remaining 7 bits (e.g., the rightmost, or least significant, 7 bits) indicate the magnitude of the movement. In the illustrated example of FIG. 1, the directional indicator bit and the 7 bits dedicated to the magnitude of movement enable each 8-bit data packet conveyed from the sensing unit 104 to the microcontroller unit 106 to represent a range of ±127 units of movement. In some examples, individual bits or segments of bits of the movement data may be dedicated to other information, such as velocity, acceleration, or information related to one or more buttons or wheels (not shown) of the mouse 100. Further, in some examples, one or more bits, or separate 8-bit chunks of data, may be dedicated to movement along a third axis (e.g., a Z axis).

In the illustrated example of FIG. 1, while 8-bit data packets are conveyed to the microcontroller unit 106, the buffers 118 from which the 8-bit data packets are sent are larger than 8-bits and, thus, can contain a piece of data (e.g., an 10-bit data word) capable of representing a movement larger than ±127 (e.g., ±511 for an 10-bit word). If a movement reading by the sensing unit 104 is greater than ±127, a plurality of 8-bit data packets are conveyed to the microcontroller unit 106 to represent the detected movement. In some examples, the microcontroller unit 106 may poll the sensing unit 104 for any new data until the buffer(s) 118 of the sensing unit 104 are empty.

As described in greater detail below, the plurality of 8-bit data packets are aggregated in larger buffers (e.g., buffers with more than an 8-bit capacity) of the microcontroller unit 106. In particular, the example microcontroller unit 106 of FIG. 1 includes 12-bit buffers 120 and a converter 122. The converter or encoder 122 translates the 8-bit data packet(s) into a 12-bit data packet to be stored in the 12-bit buffers 120. In the illustrated example of FIG. 1, the converter 122 adds the plurality of 8-bit data packets together (upon receipt of each 8-bit data packets by the microcontroller unit 106) to form a 12-bit data packet stored in the 12-bit buffers 120 of the microcontroller unit 106. For example, when a movement of +300 units is detected, two 8-bit data packets representing +127 units of movement and one 8-bit data packet representing +46 units of movement are received by the microcontroller 106, added together by the converter 122, and stored in the buffers 120 as a 12-bit representation of the detected +300 units of movement. Thus, while 24 bits are required to represent the +300 units of movement using 8-bit data packets, 12 bits are needed to represent the +300 units of movement using 12-bit data packets.

The example microcontroller unit 106, which is also coupled to the light source 102, also controls the operation of the light source 102. For example, the microcontroller unit 106 may instruct the light source 102 to deactivate after a predetermined period of inactivity, as described above. Further, the microcontroller unit 106 controls, for example, the settings (e.g., intensity) of the light source 102.

Moreover, the example microcontroller unit 106 is coupled to and controls the operation of the transceiver 108. The transceiver 108 of the illustrated example of FIG. 1 comprises a radio frequency (RF) transceiver and is coupled to an antenna 124 for wireless communication (e.g., with a receiving unit coupled to an electronic device, such as a personal or laptop computer). Additionally or alternatively, the mouse 100 may include an acoustic transceiver, an optical transceiver, a Bluetooth transceiver, or any other device capable of implementing a wireless transmission of data. The transceiver 108 is configured to communicate with, for example, another transceiver of a receiving unit coupled to or included in an electronic device to which the mouse 100 sends signals (e.g., movement data to control a cursor on the monitor of a laptop computer). As explained in detail below in connection with FIG. 2, the activation and operation of the transceiver 108 draws a significant amount of power from the power supply 110 (e.g., one or more batteries). For example, radio transmitters may account for over fifty percent of the power consumption in a wireless mouse. To conserve power, some wireless devices limit the operation of such high power-consuming components by, for example, putting the component is a low-power mode when a power supply (e.g., batteries) is diminished. However, such an approach may reduce the capabilities of the wireless device, such as the transmission range.

As described in detail below, the example methods and apparatus described herein, via an asymmetric data exchange scheme, reduce power consumption in a wireless device while maintaining the performance thereof. In one aspect of the asymmetric data exchange scheme the duty cycle of a high power-consuming component (e.g., the transceiver 108 of FIG. 1) is reduced, consequently lowering the average power consumed by the device. In a second aspect of the asymmetric data exchange scheme, the size of a data packet transferred by the high power-consuming device is increased, thereby expanding the amount of movement data that can be transferred per transmission. For example, referring again to the +300 units of movement example described above, when transferring data via the high power-consuming device, a single 12-bit transmission can represent the movement data while three transmissions are needed when using 8-bit transmissions, thereby requiring the high power-consuming device to be activated less often. These two aspects interact to enable the wireless device to perform at its full potential over a longer lifetime.

Figure 2:
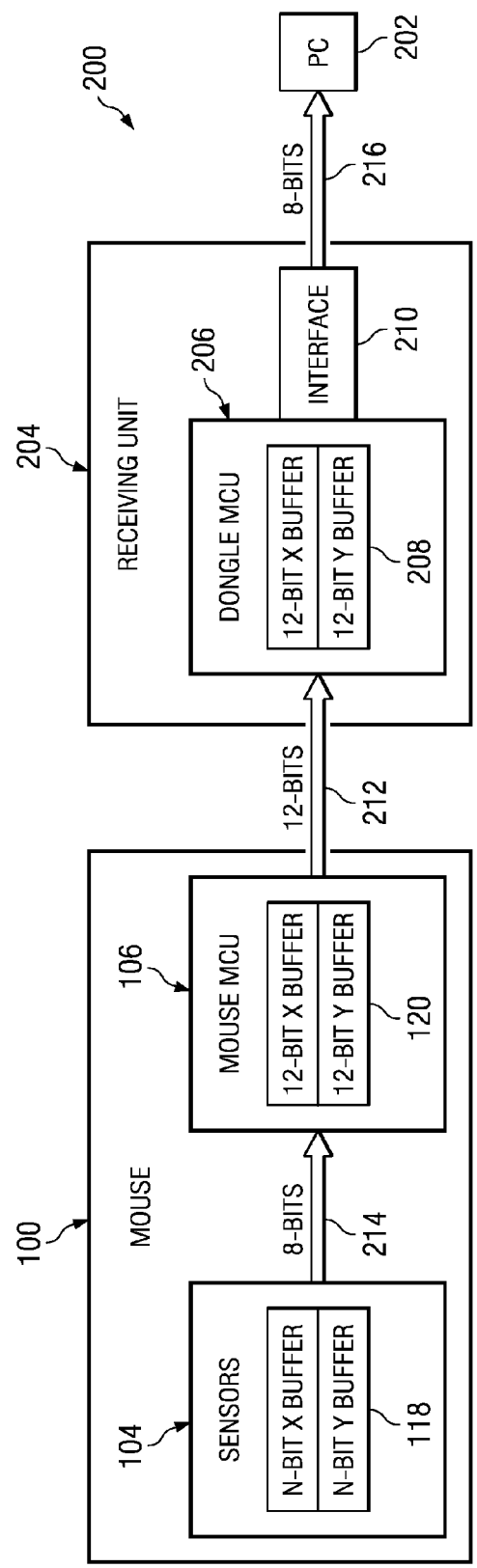
FIG. 2 illustrates an example data transmission chain that may be used in the wireless device of FIG. 1.

FIG. 2 illustrates an example data transmission chain 200 for relaying information from the example mouse 100 of FIG. 1 to an example electronic device 202, which is illustrated in FIG. 2 and referred to herein as a personal computer. While the personal computer 202 is shown in FIG. 2, the mouse 100 may communicate with a laptop computer, a personal digital assistant, or any other device capable of receiving signals (e.g., instructions regarding the position and/or actions of the mouse 100) from an input device. As described above, the mouse 100 includes sensors 104 with N-bit buffers 118, and a microcontroller unit 106 having 12-bit buffers 120. The mouse is in communication with a receiving unit 204 (e.g., via the wireless transceiver 108 of the mouse 100 and another wireless transceiver (not shown) of the receiving unit 204). The receiving unit includes a microcontroller unit 206 with 12-bit buffers 208 and an interface 210 to communicatively couple the receiving unit 204 to the personal computer 202.

Generally, the example data transmission chain 200 utilizes different frequencies (e.g., periodicities of data transmission), as well as different data packet sizes, at different stages of the data transmission chain 200. As described below in greater detail, the frequency, or number of times per second, that data is wirelessly exchanged between the mouse 100 and the receiving unit 204 is lower (e.g., is sent less frequently) than, for example, the frequency at which data is exchanged between the receiving unit 204 and the personal computer 202 and/or the frequency at which data is exchanged between the sensing unit 104 and the mouse microcontroller unit 106. Because the data exchange between the mouse 100 and the receiving unit 204 (transfer 212) involves the wireless transceiver 108, and because the operation of the wireless transceiver 108 (e.g., turning the wireless transceiver 108 on/off) consumes high amounts of power, performing this exchange less often (e.g., with a lower frequency) is desirable in terms of power conservation.

To, inter alia, offset any issues arising from lowering the aforementioned frequency (e.g., the frequency of transfer 212), the data packet size exchanged between the mouse 100 and the receiving unit 204 is larger than the size of the data exchanged between the receiving unit 204 and the personal computer 202, as well as the size of the data exchanged between the sensing unit 104 and the microcontroller unit 106 of the mouse 100. Generally, the increased data size of transfer 212 facilitates a greater throughput of movement data and, thus, enables the data to be transferred less frequently. For example, as described in greater detail below, a transfer of a 12-bit data packet can convey information representative of up to ±2047 units of movement, while a transfer of 8-bit data packets can convey information representative of up to ±127 units of movement.

More specifically, the sensing unit 104 detects movement in the X and/or Y directions and translates detected movement into the corresponding N-bit buffer(s) 118 of the sensing unit 104. As described above, the buffers 118 of the illustrated example are larger than 8 bits. For example, the sensing unit 104 may have detected a movement comprising +300 units of movement in the X direction. If the example buffers 118 of FIG. 1 have a 10-bit capacity, the +300 units of movement may be stored as, for example, "0100101100," to use a binary representation. The sensing unit 104 then conveys (e.g., after a polling of the sensing unit 104 by the microcontroller unit 106) the movement data to the microcontroller unit 106. In the illustrated example of FIG. 2, the movement data is serially transferred to the microcontroller 106 in 8-bit data packets until the buffer(s) 118 are empty. As described above, the 8-bit data packets enable a range of −127/+127 units of movement to indicate a magnitude and direction of movement in the X and/or Y directions. Thus, three 8-bit data packets (e.g., the first representing +127 units of movement, the second representing +127 units of movement, and the third representing +46 units of movement in the X direction) are sent to the microcontroller unit 106 to represent the detected +300 units of movement data. In the illustrated example, the three 8-bit data packets are each added to the value contained in the 12-bit buffer(s) 120 via the converter 122 as the 8-bit data packets are serially received at the microcontroller unit 106. Accordingly, the resulting content of the 12-bit buffer(s) 120 is a 12 bit representation of +300 units of movement (e.g., "000100101100"). As described below in greater detail, such a 12-bit buffer enables a higher limit on the amount of movement data that can be conveyed (e.g., over a wireless communication channel) to and/or from components per transmission.

This transfer 214 of the movement data is performed at a first frequency (e.g., number of transfers per unit of time, such as seconds), which is set to enable the full potential (e.g., best possible speed and/or responsiveness) of the sensing unit 104. For example, referring to the example above, the sensing unit 104 may have the capability to implement 16,000 counts per second (800 CPI*20 IPS). With the 8-bit data packets conveying a maximum of ±127 counts of movement, the frequency of transfer 214 may be approximately 126 Hz, or 126 data packets per second (16,000 counts per second/127 counts per packet) to enable communication of the 16,000 counts per second using 8-bit data packets. In previous approaches, this frequency (and size of data being transmitted) was used throughout the data transmission chain. The asymmetric approach illustrated in FIG. 2, on the other hand, can accommodate faster mouse speeds while also reducing power consumption.

Next, 12-bit data packets are transmitted at transfer 212 over a wireless communication channel via, for example, the transceiver 108 of FIG. 1. In the illustrated examples of FIGS. 1 and 2, the transceiver 108 is an RF transceiver and the transfer 212 utilizes radio waves to transmit the movement data. As described above, the transceiver 108 consumes a significant amount of power when active. Specifically, the average power consumed by the transceiver 108 is described by Equation 1 below:

$$p_{avg} = \frac{p_{active} * t_{active} + p_{inactive} * t_{inactive}}{t_{active} + t_{inactive}} \quad [\text{Equation 1}]$$

where p represents power and t represents time. Ideally, $p_{inactive}$ is approximately zero. Accordingly, a higher value for $t_{inactive}$ corresponds to a lower average power consumed by the transceiver 108. Thus, to conserve power, the frequency of the transfer 212 over the wireless transmission channel is lowered relative to, for example, the frequency of the transfer 216 between the receiving unit 204 and the personal computer 202 and/or the transfer 214 between the sensing unit 104 and the microcontroller unit 106. As described herein, the larger data size transferred of the wireless transmission enables the lowered frequency (e.g., as 12-bits can convey up to ±2047 units of movement as opposed to the ±127 capability of 8-bits, which would a plurality of transmissions for any movement magnitude greater than 127). That is, average power consumption of the transceiver 108 reduces as the duty cycle of the transceiver 108 reduces. As technology improves, designers and/or manufacturers are producing mice with higher CPI and higher IPS. For example, mice capable of supporting 2000 CPI and 45 IPS and, thus, 90,000 counts per second are currently available. To utilize the full potential of such a mouse, the traditional symmetric approach would require a frequency of 1000 Hz over the wireless transmission channel, which may prove difficult with, for example, an RF transceiver. The methods and apparatus described herein support a much lower required frequency to support the full potential of 90,000 counts per second. In particular, a mouse capable of reading 90,000 counts per second, using the methods and apparatus described herein (e.g., the 12-bit wireless transmission that can convey up to ±2047 units of movement), can operate a wireless transceiver at about 44 Hz (90,000 counts per second/2047≈44), as compared to the 1000 Hz explained above. More generally, in the illustrated example, the frequency of the wireless transmission (transfer 212) is set as low as possible, perhaps while taking into account certain design tolerances (e.g., to avoid saturation of the buffers 120 and/or the buffers 208).

To maintain the full potential (e.g., best possible responsiveness) of the mouse 100 with the lowered frequency of transfer 212, an increased amount of bits (as compared to the 8 bits conveyed from the sensing unit 104 to the microcontroller unit 106 of the mouse 100) of movement data are conveyed from the microcontroller unit 106 to the receiving unit 204 or, more specifically, the microcontroller 206 of the receiving unit 204. In the illustrated example of FIG. 2, 12 bits of movement data are conveyed over the wireless communication channel in transfer 212. While the example of FIG. 2 describes a 12-bit wireless transmission, other increased amounts (e.g., 9 or 10 bits) may be conveyed. As described above, the 12-bit buffers 120 of the microcontroller unit 106 include a 12-bit data packet representing up to ±2047 units of movement, as accumulated by receiving one or more 8-bit data packets from the sensing unit 104.

The 12-bit data packets of movement data are received by the 12-bit buffers 208 of the microcontroller 206 of the receiving unit 204 (described as a "Dongle MCU" in FIG. 2). The microcontroller 206 is coupled to and/or includes the interface 210, which is communicatively coupled to the personal computer 202 (e.g., via a USB port). Alternatively, the receiving unit 204 may be coupled to a laptop computer, a personal digital assistant, or any other device capable of receiving signals (e.g., instructions regarding the position and/or actions of the mouse 100) from an input device. The transfer of data from the receiving unit 204 to the personal computer 202 may be limited to a predetermined data size. For example, USB ports may limit transfer 216 to 8-bits. In the illustrated example of FIG. 2, 8-bit data packets are conveyed to the personal computer at a frequency greater than the frequency of the wireless transmission (transfer 212), such that the buffers 208 of the receiving unit 204 do not become saturated. Thus, referring back to the example described above, where the 12-bit buffers 208 of the microcontroller 206 contain information representing +300 units of movement, three 8-bit data packets (e.g., the first representing +127, the second representing +127, and the third representing +46) are conveyed (e.g., serially) to the personal computer 202 where the data packets are processed (e.g., assembled) to, for example, instruct a cursor to move a correlating distance across a display.

Figure 3:
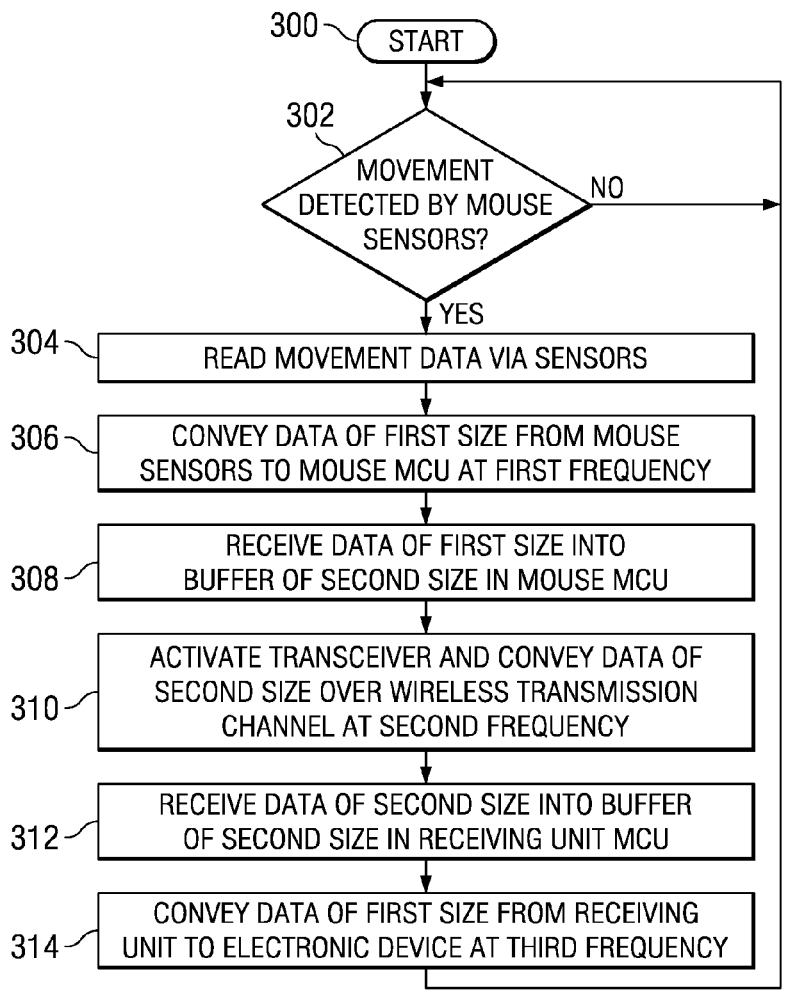
FIG. 3 is a flowchart illustrating an example process that may be carried out to implement the example wireless device of FIG. 1 and/or the example transmission chain of FIG. 2.

FIG. 3 is a flowchart illustrating an example process that may be executed to implement a wireless device, such as the example mouse 100, the example receiving unit 204, and/or the components thereof illustrated and described in connection with FIGS. 1 and 2. The example process of FIG. 3 begins when, for example, the personal computer 202 of FIG. 2, with which the mouse 100 communicates, is activated or taken out of a sleep mode (block 300). As described above, the mouse 100 of FIGS. 1 and 2 includes one or more sensors (e.g., photodetectors) of the sensing unit 104 to detect movement of the mouse 100. The sensing unit 104 waits for a detection of movement (block 302) and, in response to such a detection, reads data related to the detected movement (block 304). In the illustrated example, the data is stored in one of the N-bit buffers 118 of FIGS. 1 and 2. The movement data is then conveyed (e.g., as in transfer 214 of FIG. 2) in data packets of a first size (e.g., 8 bits) from the sensing unit 104 to the microcontroller unit 106 of FIGS. 1 and 2 at a first frequency (block 306). As described above, the frequency of this transmission (e.g., the periodicity of transfers) is set to enable a full potential (e.g., speed and corresponding responsiveness) of the sensing unit 104 and to avoid saturation of the buffers 118. In some examples, the first frequency varies over time depending on the amount of movement data currently stored in the N-bit buffers 118. Specifically, the sensing unit 104 is checked for the presence of movement data (e.g., at a frequency approximately equal to the second frequency described below) and, upon a detection of movement data, the N-buffers 118 transfer the movement data until the N-buffers 118 are empty (e.g., the movement data is transferred continuously). The time needed to transfer the movement data from the sensing unit 104 depends on the amount of movement data (e.g., more movement data takes longer to transfer). Thus, depending on the amount of movement data per transmission, the average frequency of the transmission from the sensing unit 104 to the microcontroller 106 can be greater than or equal to the frequency of the wireless transmission (which is described as the second frequency in the process of FIG. 3).

The microcontroller unit 106 includes data buffers of a second size (e.g., 12 bits) to receive the smaller sized data packets from the mouse sensing unit 104 (block 308). For example, in response to a polling of the sensing unit 104 b the microcontroller unit 106, the N-bit buffers 118 of the sensing unit 104 may be emptied by transmitting one or more 8-bit data packets to convey the detected movement data. When the magnitude of the detected movement data is greater than 127, more than one 8-bit data packet is transmitted. In the illustrated example, the 8-bit data packets received at the microcontroller unit 106 are accumulated (e.g., added together as they are serially received) to form a 12-bit data packet occupying the 12-bit fuggers 120. As described above, the 12-bit data packet is capable of conveying up to ±2047 units of movement, thereby increasing the maximum potential throughput of a wireless transmission.

To communicate wirelessly with the personal computer 202, the microcontroller 106 of the mouse 100 is coupled to the transceiver 108 of FIG. 1. The transceiver 108 is activated and operated to convey data of the second size (e.g., 12 bits) over a wireless transmission channel at a second frequency (block 310). As described above, the transceiver 108 consumes a significant amount of power and, thus, a lower frequency (e.g., operations or activations per second) of activation and operation is preferable for purposes of preserving, for example, battery lifetime. Therefore, as described above, the second frequency (e.g., the frequency of transfer 212 of FIG. 2) is lowered to reduce the amount of operation time, but is also set high enough to maintain the potential of the mouse (e.g., to provide high level of responsiveness despite any transmission losses).

The data packets of the second size (e.g., 12 bits) are received into buffers 208 (which are 12-bit buffers) in the receiving unit 204 of FIG. 2 (block 312). The receiving unit 204 is coupled to a wireless transceiver and also includes the microcontroller 206 to control, for example, transmission of the data to and from the receiving unit 204. The movement data in the buffers 208 of the receiving unit 204 is then conveyed to the personal computer 202 in data packets of the first size (e.g., 8 bits) (block 314). This transfer (e.g., transfer 216 of FIG. 2) is performed at a third frequency greater than the frequency of transmission between the microcontroller unit 106 and the receiving unit 204 (e.g., transfer 212 of FIG. 2) to, for example, avoid saturation of the buffers in the receiving unit 204. Further, in the illustrated example, when transferring movement data from the receiving unit 204 to the personal computer 202, interpolation is used to create a smoother movement of the display element (e.g., a cursor) associated with the mouse 100. For example, where the detected movement data includes +300 units of movement in the X direction and +50 units of movement in the Y direction, the X movement is transferred in three transmissions (two transmissions of +127 units and one transmission of +46 units), while the entire Y movement is transferred in one transmission (e.g., with the first +127 units of X movement). This may result in a seemingly intermittent or discontinuous movement of the display element. Using any suitable type of interpolation, the movement of the display element can be smoothened to create a more linear displacement. For example, the +300 units of X movement can be interpolated to three equal transmissions of +100 units of movement and the +50 units of Y movement can be interpolated to one transmission of +16 units and two transmissions of +17 units, thereby creating a smoother or more linear movement across a display. Control then returns to block 302 where the mouse 100 waits for the next movement data.

Figure 4:
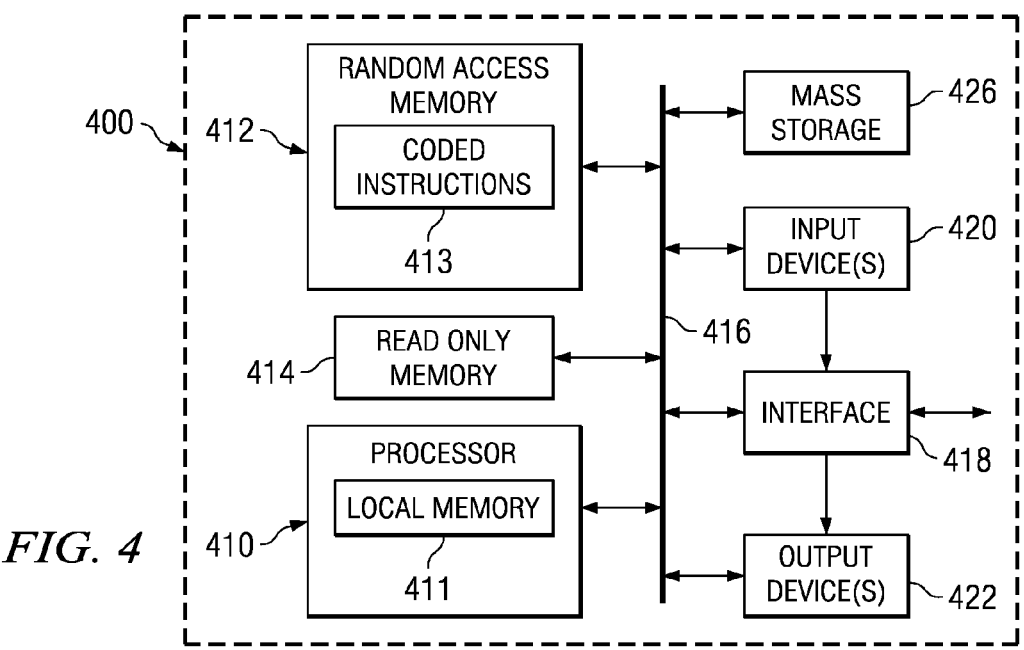
FIG. 4 is a block diagram of an example processor platform capable of implementing the example data transmission chain of FIG. 1 and the example process of FIG. 3.

FIG. 4 is a block diagram of an example processor platform 400 capable of executing the example process of FIG. 3 to implement the apparatus and/or methods disclosed herein. For example, the processor platform 400 may implement the microcontroller unit 106 and/or the microcontroller 206 of the receiving unit 204 of FIGS. 1 and 2. Further, the sensing unit 104, buffers 118 and 120, and/or 208, the microcontroller unit 106, the microcontroller 206, and/or the interface 210 of FIGS. 1 and 2 may be implemented by hardware, software, firmware, and/or any combination of hardwire, software, and/or firmware.

The processor platform 400 of the instant example includes a processor 410 such as a general purpose programmable processor. The processor 410 includes a local memory 411, and executes coded instructions 413 present in the local memory 411 and/or in another memory device (e.g., the non-volatile memory 414). The processor 410 may execute, among other things, the example flowchart illustrated in FIG. 3. The processor 410 may be any type of processing unit, such as a microprocessor from the Intel® Centrino® family of microprocessors, the Intel® Pentium® family of microprocessors, the Intel® Itanium® family of microprocessors, the Intel XScale® family of processors, and/or the Motorola® family of processors. Of course, other processors are also appropriate, such as an 8051 processor.

The processor 410 is in communication with a main memory including a volatile memory 412 and a non-volatile memory 414 via a bus 416. The volatile memory 412 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 414 may be implemented by Read Only Memory (ROM), flash memory and/or any other desired type of memory device. Access to the main memory 412, 414 is typically controlled by a memory controller (not shown).

The processor platform 400 also includes an interface circuit 418. The interface circuit 418 may be implemented by any type of interface standard, such as an Ethernet interface, a universal serial bus (USB), and/or a third generation input/output (3GIO) interface.

One or more input devices 420 are connected to the interface circuit 418. The input device(s) 420 permit a user to enter data and commands into the processor 410. The input device(s) can be implemented by, for example, a keyboard, a mouse, a touchscreen, a track-pad, a trackball, isopoint and/or a voice recognition system.

One or more output devices 422 are also connected to the interface circuit 418. The output devices 422 can be implemented by, for example, a transceiver.

The interface circuit 418 also includes a communication device such as a modem or network interface card to facilitate exchange of data with external computers via a network (e.g., an Ethernet connection, a digital subscriber line (DSL), a telephone line, coaxial cable, a cellular telephone system, etc.).

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

Although certain methods, apparatus, systems, and articles of manufacture have been described herein, the scope of coverage of this patent is not limited thereto. To the contrary, this patent covers all methods, apparatus, systems, and articles of manufacture fairly falling within the scope of the appended claims either literally or under the doctrine of equivalents.

What is claimed is:

1. A method comprising:
sensing movement of a wireless mouse using a sensor unit;
conveying data corresponding to the movement as a first set of data packets of a first size at a first frequency from the sensor unit to a first microcontroller-so as to store the first set of data packets into a first set of data buffers within the first microcontroller that have a second size, wherein the second size is greater than the first size;
wirelessly transmitting a second set of data packets of the second size from the first microcontroller to a second microcontroller at a second frequency so as to store the data packets of the second size into a second set of data buffers within the second microcontroller that have the second size; and
conveying data corresponding to the movement as a third set of data packets of the first size at a third frequency from the second microcontroller to a processing unit.

2. The method of claim 1, wherein the second frequency is less than the first and third frequencies.

3. The method of claim 1, wherein the first frequency varies over time.

4. The method of claim 3, wherein the first frequency is greater than or equal to the second frequency.

5. The method of claim 1, wherein the step of wirelessly transmitting further comprises activating a wireless transceiver within the mouse.

6. The method of claim 1, wherein the method further comprises interpolating wirelessly received data before the step of conveying data.

7. The method of claim 1, wherein the first size is 8 bits and the second size is 12 bits.

8. An apparatus comprising:
a mouse having:
a sensor unit to detect movement;
a first microcontroller having a first set of data buffers with a first size, wherein the first microcontroller is coupled to the sensor unit conveys so as to receive data packets of a second size at a first frequency, and wherein the first microcontroller stores the data packets of the first size from the sensor unit into the first set of data buffers, and wherein second size is less than the first size;
a receiving unit having a second microcontroller having a second set of data buffers of the first size, wherein the first microcontroller wirelessly transmits a second set of data packets of the second size at a second frequency to the second microcontroller; and
a processing unit that receives a third set of data packets of the second size at a third frequency from the second microcontroller.

9. The apparatus of claim 8, wherein the mouse further comprises a light source and wherein the sensor unit comprises an array of photodetectors to detect light emitted by the light source.

10. The apparatus of claim 8, further comprising a first wireless transceiver coupled to the first microcontroller and a second wireless transceiver coupled to the second microcontroller.

11. The apparatus of claim 8, wherein the second frequency is less than the first and third frequencies.

12. The apparatus of claim 8, wherein the first frequency varies over time.

13. The apparatus of claim 12, wherein the first frequency is greater than or equal to the second frequency.

14. The apparatus of claim 8, wherein the processing unit is at least one of a personal computer, a laptop computer, or a personal digital assistant.

15. The apparatus of claim 8, wherein the mouse powered by one or more batteries.

16. The apparatus of claim 9, wherein the light source comprises at least one of a laser or a light emitting diode.

17. The apparatus of claim 8, wherein the first size is 12 bits and the second size is 8 bits.

18. An apparatus comprising:
a mouse having:
a power supply;
a movement detector that is coupled to the power supply;
a first microcontroller that is coupled to the movement detector and power supply, wherein the first microcontroller includes:
a first set of buffers having a first size; and
an encoder that is configured to receive a first set of data packets of a second size from the movement detector and to encode the first set of data packets so as to be stored in the first set of buffers, wherein the first size is greater than the second size;
a transceiver that is coupled to the power supply and the first microcontroller, wherein the transceiver is configured to wireless transmit a second set of data packets of the first size from the first set of data buffers;
a receiving unit that is configured to receive the second set of data packet wirelessly from the mouse, wherein the receiving unit includes:
a second microcontroller having a second set of buffers having the first size; and
an interface that is coupled to the second microcontroller; and
a processing unit that is coupled to the interface, wherein the processing unit is configured to receive a third set of data packets having the second size.

19. The apparatus of claim 18, wherein the movement detector further comprises:
a light source that is coupled to the power supply; and
a sensing unit that is coupled to the light source and power supply, wherein the sensing unit is configured to detect movement of the mouse.

20. The apparatus of claim 19, wherein the first size is 12 bits and the second size is 8 bits.

21. The apparatus of claim 20, wherein the light source comprises at least one of a laser or a light emitting diode.

* * * * *